United States Patent
Bennett

[11] Patent Number: 5,883,212
[45] Date of Patent: *Mar. 16, 1999

[54] CONDUCTIVITY EXALTATION IN RADIATION CURED ELECTRICALLY CONDUCTIVE COATINGS

[75] Inventor: Everett Wyman Bennett, Easthampton, Mass.

[73] Assignee: Rexam Graphics, Inc., South Hadley, Mass.

[*] Notice: The term of this patent shall not extend beyond the expiration date of Pat. No. 5,707,554.

[21] Appl. No.: 647,021

[22] Filed: May 8, 1996

[51] Int. Cl.$^6$ .......................... C08F 226/02; C08F 220/34
[52] U.S. Cl. .......................... 526/312; 521/32; 526/292.2; 526/310; 526/318; 526/318.4; 526/320; 526/328
[58] Field of Search .................................... 526/312, 320, 526/310, 292.2; 521/32

[56] References Cited

U.S. PATENT DOCUMENTS

| | | | |
|---|---|---|---|
| 4,322,331 | 3/1982 | Shay | 524/815 |
| 4,420,541 | 12/1983 | Shay | 428/523 |
| 4,524,087 | 6/1985 | Engel | 427/2 |
| 4,558,092 | 12/1985 | Reinecke | 524/817 |
| 4,830,939 | 5/1989 | Lee et al. | 429/192 |
| 4,877,687 | 10/1989 | Azegami | 428/520 |
| 4,981,729 | 1/1991 | Zaleski | 427/393.5 |
| 5,035,849 | 7/1991 | Vemura et al. | 264/255 |
| 5,130,391 | 7/1992 | Ahmed | 526/288 |
| 5,413,731 | 5/1995 | Adler | 252/174.24 |
| 5,483,321 | 1/1996 | Cahill et al. | 355/200 |
| 5,486,421 | 1/1996 | Kobayashi | 428/421 |
| 5,621,057 | 4/1997 | Herzig et al. | 526/248 |

*Primary Examiner*—Fred Zitomer
*Attorney, Agent, or Firm*—Ratner & Prestia

[57] ABSTRACT

An electrically conductive polymeric material useful in electrographic imaging elements is disclosed. The material comprises, in polymerized form: (1) a polymerizable, conductivity exalting comonomer selected from the group consisting of interpolymerizable acids with an acid number between 100 and 900, hydroxyalkyl esters of acrylic or methacrylic acid, cyanoalkyl esters of acrylic or methacrylic acid, and combinations thereof; (2) a polymerizable, ethylenically unsaturated ammonium precursor; and, optionally, (3) other polymerizable precursors. A layer of the material has an apparent surface resistivity of $1 \times 10^4$ to $1 \times 10^7$ $\Omega/\square$.

22 Claims, 1 Drawing Sheet

Fig. 1

CONDUCTIVITY EXALTATION IN RADIATION CURED ELECTRICALLY CONDUCTIVE COATINGS

FIELD OF THE INVENTION

This invention relates to electrically conductive polymeric materials. In particular this invention relates to the use of conductivity exalting comonomers to increase the conductivity of radiation cured electrically conductive coatings.

BACKGROUND OF THE INVENTION

In electrographic imaging a latent image of electric charge is formed on a surface of a carrier sheet. Toner particles that are attracted to the charge are applied to the surface of the carrier sheet to render the latent image visible. The toned image is fixed, either by fusing the toner particles to the surface of the carrier sheet, or by first transferring the toned image to a receptor and fusing, or otherwise permanently affixing, the particles to the receptor.

The latent image is produced by imagewise deposition of electrical charge onto the carrier surface. Typically, charged styli, arranged in linear arrays across the width of a moving dielectric surface, are used to create the latent image. Such processes are disclosed, for example, in Helmberger, U.S. Pat. No. 4,007,489; Doggett, U.S. Pat. No. 4,731,542; and St. John, U.S. Pat. No. 4,569,584.

An electrographic imaging element requires a conductive layer. The conductive layers may be metallic, such as when a sheet of metal is used as a substrate for the imaging element. Or it may be a conductive coating on an otherwise non-conducting substrate, such as a polyethylene terephthalate film coated with a conductive metal oxide, such as tin oxide, or a paper sheet bearing a conductive coating.

It is well known that both bulk and surface electrical conductivity can be imparted to many types of materials, especially polymeric materials, by the incorporation of ionic substances, such as monomeric or polymeric quaternary ammonium salts. Low concentrations of ionic additives, or of hydroscopic compounds such as polyglycol ethers or amines, can provide antistatic properties, i.e, surface resistivity of about $10^9$–$10^{10}$ $\Omega/\square$. Larger concentrations of quaternary salts can afford surface resistivities as low as $10^2$–$10^5$ $\Omega/\square$.

There are, however, significant problems associated with such conductivizing agents. Low molecular weight quaternary salts and hydroscopic additives migrate from the bulk of the host material to the surface. As the conductivizing agent diffuses to the surface the surface properties may vary with time. Because the conductivizing agent is not bound to the surface, contact with other materials can remove it.

Although these problems are solved by the use of polymeric conductivizing agents as bulk additives, there are significant problems associated with these materials as well. Use of the widely used quaternary derivatives of polystyrene and the cyclopolymer derived from dimethyldiallylammonium chloride (DMDAAC) is limited both by their water and alcohol solubility and by their tendency to become soft, tacky, and fragile at high relative humidities, where they exhibit their maximum conductivity.

Polymeric quaternary salts are also immiscible with most other polymers, which limits there usefulness as bulk additives. Because phase separation may occur during the coating process, it is difficult to produce homogenous coatings with these materials.

As described in Shay, U.S. Pat. Nos. 4,322,331 and 4,420,541, some of these problems can be overcome by addition of polymerizable quaternary ammonium monomers to radiation polymerizable compositions to produce a conductive cross-linked copolymer. However, high levels of quaternary ammonium monomers are required to produce conductivities that are useful for the production of electrographic imaging elements. Thus, the polymers formed by polymerization of these compositions tend to be hydroscopic and produce coatings that are soft and tacky. These coatings generally do not form acceptable electrographic element. Therefore, a need exists for polymerizable compositions that will produce conductive polymeric materials with apparent surface resistivities of $1\times10^4$ to $1\times10^7$ $\Omega/\square$, yet do not contain so much polymerizable, ethylenically unsaturated ammonium precursor that the coating is soft and tacky.

SUMMARY OF THE INVENTION

The invention is an electrically conductive polymeric material, which comprises in polymerized form:

(A) 40 to 100 parts by weight, based on the total weight of polymerizable precursors and comonomers in the material, of:
  (1) a polymerizable, conductivity exalting comonomer, said comonomer selected from the group consisting of interpolymerizable acids with an acid number between 100 and 900, hydroxyalkyl esters of acrylic or methacrylic acid, cyanoalkyl esters of acrylic or methacrylic acid, and combinations thereof; and
  (2) a polymerizable, ethylenically unsaturated ammonium precursor;
    wherein the ratio of said polymerizable, conductivity exalting comonomer to said polymerizable, ethylenically unsaturated ammonium precursor is in the range of 0.25 to 2.0; and (B) 0 to 60 parts by weight, based on the total weight of polymerizable precursors and comonomers in the material, of other polymerizable precursors;

wherein a layer of said material has a surface resistivity of $1\times10^4$ to $1\times10^7$ $\Omega/\square$.

DETAILED DESCRIPTION OF THE INVENTION

The invention is an electrically conductive polymeric material, which comprises in polymerized form: one or more conductivity exalting comonomers; one or more polymerizable, ethylenically unsaturated ammonium precursors; and, optionally, one or more other polymerizable precursors. The comonomer is selected from the group consisting of interpolymerizable acids with an acid number between 100 and 900, hydroxyalkyl esters of acrylic or methacrylic acid, cyanoalkyl esters of acrylic or methacrylic acid, and combinations thereof. The layer may also include a photoinitiator that activates free radical polymerization when the precursor mixture is exposed to ultraviolet light.

By suitable choice of concentrations of the polymerizable components, apparent surface conductivity can be varied over a wide range, i.e., a resistivity between about $1\times10^4$ $\Omega/\square$ and $1\times10^7$ $\Omega/\square$, without adversely affecting the other properties of the material. A layer of this material typically has an apparent surface resistivity of $1\times10^4$ to $1\times10^7$ $\Omega/\square$, preferably $5\times10^4$ to $5\times10^6$ $\Omega/\square$.

Conductivity Enhancing Comonomers

The conductivity enhancing comonomers are selected from the group consisting of (1) interpolymerizable acids with an acid number between 100 and 900, (2) hydroxyalkyl esters of acrylic or methacrylic acid, and (3) cyanoalkyl esters of acrylic or methacrylic acid. A single comonomer may be present in the material, or a mixture of comonomers may be present to provide the desired resistivity.

Typical interpolymerizable acids that may be used to enhance electrical conductivity include acrylic acid, methacrylic acid, β-carboxyethyl acrylate, itaconic acid, 2-(acryloyloxy)ethyl maleate, 2-(methacryloyloxy)ethyl maleate, 2-(acryloyloxy)propyl maleate, 2-(methacryloyloxy)propyl maleate, 2-(acryloyloxy)ethyl succinate, 2-(methacryloyloxy)-ethyl succinate, 2-(acryloyloxy)-ethyl o-phthalate, 2-(methacryloyloxy) ethyl o-phthalate, 1-carboxy-2-[2-acryloxyloxyethylcarboxylate]cyclohex-4-ene, 1-carboxy-2-[2-methacryloxyloxyethylcarboxylate]cyclohex-4-ene; and carboxylated additives having acid numbers of 100 to 900, such as Ebecryl® 169 and Ebecryl® 170. As is well known to those skilled in the art, acid number is defined as the number of mg of potassium hydroxide required to neutralize 1 g of the interpolymerizable acid. Preferred interpolymerizable acids are the low molecular weight acidic acrylic precursors, β-carboxyethyl acrylate and 2-(acryloyloxy)-ethyl maleate.

Typical hydroxyalkyl esters of acrylic or methacrylic acid that may be used to enhance electrical conductivity include 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate.

Typical cyanoalkyl esters of acrylic or methacrylic acid that may be used to enhance electrical conductivity include 2-cyanoethyl acrylate and 2-cyanoethyl methacrylate.

Ethylenically Unsaturated Ammonium Precursors

"Ammonium precursor" means an ethylenically unsaturated, quaternary ammonium salt compound which contains an ammonium cation and an inorganic or organic salt anion. Electrical conductivity of the polymer is obtained by use of the reactive ammonium precursors such as (3-(methacryloylamino)propyl) trimethylammonium chloride (MAPTAC), dimethylaminoethyl methacrylate dimethylsulfate quaternary (Ageflex® FM1Q80DMS), dimethylaminoethyl acrylate methylchloride quaternary (Ageflex® FA1Q80MC), dimethylaminoethyl methacrylate methylchloride quaternary (Ageflex® FM1Q75MC), dimethylaminoethyl acrylate dimethylsulfate quaternary (Ageflex® FA1Q80DMS), diethylaminoethyl acrylate dimethylsulfate quaternary (Ageflex® FA2Q80DMS), dimethyldiallylammonium chloride (Ageflex® DMDAC), and vinylbenzyltrimethylammonium chloride, all of which are water soluble and, typically supplied with up to 50 wt % water. Consequently, such quaternary components are only miscible with a few very hydrophilic precursors, unless a coupling solvent is used such as those described herein below.

Quaternary salt precursors typically have the following structures:

in which $R_1$ is H, methyl, or ethyl; Y is —O— or —(NR$_3$)— wherein $R_3$ is H or a $C_1$–$C_4$ alkyl; m is an integer from 1 to 4, each $R_2$ individually is a $C_1$–$C_4$ alkyl group; and [X]$^-$ is an anion.

In particular the quaternary salt precursors contains a cation taken from the group consisting of (3-(methacryloylamino)-propyl)-trimethylammonium, (2-(methacryloyloxy)-ethyl)trimethylammonium, (2-(acryloyloxy)ethyl)trimethylammonium, (2-(methacryloyloxy)-ethyl)-methyldiethylammonium, 4-vinyl-benzyltrimethylammonium, dimethyldiallylammonium and mixtures thereof. The anion of quaternary salt precursors may be any inorganic or organic salt anion conventionally used in such quaternary salts such as chloride, methosulfate, nitrate, and the like. It was noted that the conductivity (or resistivity) of the coating is determined largely, but not wholly, by the molal concentration (number of moles per kilogram, all densities being close to unity) of quaternary salt present. For this reason, the most desirable quaternary structure is that with the lowest molecular weight, 2-acryloyloxyethyl trimethylammonium chloride, which is also expected to polymerize more easily than a methacrylate.

Other Polymerizable Precursors

The material may comprise, in polymerized from, one or more other polymerizable precursors. The term "other polymerizable precursors" does not include the conductivity enhancing comonomers and the ethylenically unsaturated ammonium precursors, each of which is a polymerizable precursor. These precursors include monofunctional polymerizable precursors and multifunctional polymerizable precursors. If release is desired, a polymerizable, ethylenically unsaturated, organo-silicone may be included to provide release.

Multifunctional polymerizable precursors function as free radical cross-linking agents to accelerate growth of the polymer during polymerization. A multifunctional polymerizable precursor may be a multifunctional monomeric material, an oligomeric material, or a combination thereof. "Multifunctional" means two or more ethylenically unsaturated functional groups capable of free radical addition polymerization. "Monomeric materials" are identified as "monomers". The term "oligomer" or "oligomeric" has its conventional meaning, a polymer whose properties change with the addition of one or a few repeating units. As such an oligomer functions as a pre-polymer having ethylenic groups capable of further polymerization. "Oligomeric materials" hereinafter are identified as "oligomers".

Typical multifunctional monomers useful in forming the polymeric material include trimethylolpropane triacrylate, pentaerythritol triacrylate, pentaerythritol tetraacrylate, pentaerythritol tetramethacrylate, ethoxylated-trimethylolpropane triacrylate, glycerolpropoxy triacrylate, ethyleneglycol diacrylate, tripropyleneglycol diacrylate, and tetraethyleneglycol diacrylate. Particularly useful for this invention are the ethoxylated precursors such as ethoxylated-trimethylolpropane triacrylate (TMPEOTA).

Oligomers typically are used in the coating dispersions to achieve a cure rate rapid enough to meet polymer productivity goals. Typical oligomers useful in forming the polymeric material include acrylated urethanes, polyesters, and polyepoxides; and acrylics. The criteria used to select useful oligomers are: viscosity, compatibility, glass transition temperature (Tg), degree of functionality, and coating glossiness. Illustrative of such oligomers are the commercial products tabulated along with their properties in the following tables.

Acrylated urethanes which are useful include: Ebecryl® 230, an aliphatic urethane; Ebecryl® 244, an aliphatic urethane & 10% 1,6-hexanediol diacrylate; Ebecryl® 265, an aliphatic urethane & 25% tripropyleneglycol diacrylate; Ebecryl® 270, an aliphatic urethane; Ebecryl® 285, an aliphatic urethane & 25% tripropyleneglycol diacrylate; Ebecryl® 4830, an aliphatic urethane & 10% tetraethyleneglycol diacrylate; Ebecryl® 4833, an aliphatic urethane & 10% N-vinyl-2-pyrrolidone; Ebecryl® 4834, an aliphatic urethane & 10% N-vinyl-2-pyrrolidone; Ebecryl® 4881, an aliphatic urethane & 10% tetraethyleneglycol diacrylate; Ebecryl® 4883, an aliphatic urethane & 15% tripropyleneglycol diacrylate; Ebecryl® 8803-20R, an aliphatic urethane & 20% tripropyleneglycol diacrylate & 8% 2-(2-ethoxyethoxy)ethyl acrylate; and Ebecryl® 8803, an aliphatic urethane. Properties of these products are given in Table 1.

TABLE 1

| Product | Viscosity[1] | Mol. Wt.[2] | Groups[3] | Tg[4] |
| --- | --- | --- | --- | --- |
| Ebecryl ® 230 | 30–50 @ 25° | — | 2 | 39 |
| Ebecryl ® 244 | 7.0–9.0 @ 60° | 2000 | 2 | — |
| Ebecryl ® 265 | 25–45 @ 25° | 2000 | 3 | 38 |
| Ebecryl ® 270 | 2.5–3.5 @ 60° | 1500 | 2 | — |
| Ebecryl ® 285 | 20–30 @ 25° | 1200 | 2 | 42 |
| Ebecryl ® 4830 | 2.5–4.5 @ 60° | 1200 | 2 | 42 |
| Ebecryl ® 4833 | 2.0–3.0 @ 60° | 1200 | 2 | 47 |
| Ebecryl ® 4834 | 3.0–4.0 @ 60° | 1600 | 2 | 32 |
| Ebecryl ® 4881 | 5.3–8.1 @ 60° | 2000 | 2 | 44 |
| Ebecryl ® 4883 | 2.8–4.2 @ 60° | 1600 | 2 | 47 |
| Ebecryl ® 8800-20R | 1.8–3.0 @ 65° | 1600 | 2.5 | 59 |
| Ebecryl ® 8803 | 25–35 @ 65° | 2300 | 2.4 | 52 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Polyester oligomers which are useful include: Ebecryl® 450, a fatty acid modified polyester; Ebecryl® 505, an unsaturated polyester & 40% tripropyleneglycol diacrylate; Ebecryl® 509, an acid modified unsaturated polyester & 30% 2-hydroxyethyl methacrylate; Ebecryl® 524, an acid modified polyester & 30% 1,6-hexanediol diacrylate; Ebecryl® 525, an acid modified polyester & 40% tripropyleneglycol diacrylate; Ebecryl® 584, a chlorinated polyester & 40% 1,6-hexanediol diacrylate; Ebecryl® 585, a chlorinated polyester & 40% tripropyleneglycol diacrylate; Ebecryl® 810, a tetrafunctional polyester acrylate; Ebecryl® 1810, a tetrafunctional polyester acrylate; and Photomer® 5018, an aliphatic tetrafunctional polyester acrylate. Properties of these products are given in Table 2.

TABLE 2

| Product | Viscosity[1] | Mol. Wt.[2] | Groups[3] | Tg[4] |
| --- | --- | --- | --- | --- |
| Ebecryl ® 450 | 6–8 @ 25° | — | 6 | |
| Ebecryl ® 505 | 1.75–2.25 @ 60° | — | | 45 |
| Ebecryl ® 509 | 6–8 @ 25° | — | | |
| Ebecryl ® 524 | 55–65 @ 25° | 1000 | | |
| Ebecryl ® 525 | 35–45 @ 25° | 1000 | | |
| Ebecryl ® 584 | 1.5–2.5 @ 25° | — | | 44 |
| Ebecryl ® 585 | 4.2–5.2 @ 25° | — | | 29 |
| Ebecryl ® 810 | 0.45–0.65 @ 25° | 900 | 4 | 31 |
| Ebecryl ® 1810 | 0.45–0.65 @ 25° | 900 | 4 | 32 |
| Photomer ® 5018 | 0.7–1.4 @ 25° | 1000 | 4 | 0 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Useful polyepoxy oligomers include: Ebecryl® 605, a bisphenol A epoxy diacrylate & 25% tripropyleneglycol diacrylate; Ebecryl® 616, an epoxy dimethacrylate oligomer & 25% trimethylolpropane triacrylate; Ebecryl® 860, an epoxidized oil acrylate; Ebecryl® 1608, a bisphenol A epoxy acrylate & 20% propoxylated glycerol triacrylate; Ebecryl® 3200, a blend of aliphatic and aromatic acrylated epoxy resins; Ebecryl® 3201, an acrylated epoxy resin; Ebecryl® 3605, a partially acrylated bisphenol A epoxy resin; Ebecryl® 3700-20T, a bisphenol A epoxy acrylate & 20% trimethylolpropane triacrylate; Ebecryl® 3701-20T, a modified bisphenol A epoxy acrylate oligomer & 20% trimethylolpropane triacrylate; and Ebecryl® 3700, a bisphenol A epoxy diacrylate. Properties of these products are given in Table 3.

TABLE 3

| Product | Viscosity[1] | Mol. Wt.[2] | Groups[3] | Tg[4] |
| --- | --- | --- | --- | --- |
| Ebecryl ® 605 | 6.5–8.5 × 10³ @ 25° | 525 | 2 | 65 |
| Ebecryl ® 616 | 20–30 @ 25° | 555 | 2 | 82 |
| Ebecryl ® 860 | 19–31 @ 25° | 1200 | 3 | 13 |
| Ebecryl ® 1608 | 0.9–1.1 @ 60° | 525 | 2 | 67 |
| Ebecryl ® 3200 | 1.5–3.0 @ 25° | 435 | 1.6 | 48 |
| Ebecryl ® 3201 | 2.5–5.0 @ 25° | 426 | 1.9 | 8 |
| Ebecryl ® 3605 | 0.5–0.8 @ 65° | 450 | 1 | 43 |
| Ebecryl ® 3700-20T | .43–.63 @ 65° | 524 | 2 | 75 |
| Ebecryl ® 3701-20T | .85–1.25 @ 65° | 840 | 2 | 62 |
| Ebecryl ® 3700 | 1.8–2.8 @ 65° | 524 | 2 | 65 |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Acrylic oligomers which are useful include: Ebecryl® 745, an acrylic oligomer & 23% 1,6-hexanediol diacrylate & 23% tripropyleneglycol diacrylate; Ebecryl® 754, an acrylic oligomer & 30% 1,6-hexanediol diacrylate; and Ebecryl® 1755, an acrylic oligomer & 35% tripropyleneglycol diacrylate. Properties of these products are given in Table 4.

TABLE 4

| Product | Viscosity[1] | Mol. Wt.[2] | Groups[3] | Tg[4] |
| --- | --- | --- | --- | --- |
| Ebecryl ® 745 | 25–35 @ 25° | | | 30 |
| Ebecryl ® 754 | 70–80 @ 25° | | | 22 |
| Ebecryl ® 1755 | 70–80 @ 25° | | | 15 |
| Ebecryl ® 860 | 19–31 @ 25° | 1200 | 3 | |

[1]Viscosity is given in "10 poise" units & temperature is in "°C.".
[2]Molecular weight is based on neat undiluted oligomer.
[3]"Groups" is the number of ethylenic functional groups.
[4]"Tg" is glass transition temperature given in °C.

Epoxy oligomers are generally useful because of their rapid cure rates and ability to provide high gloss. However, because the majority of epoxy oligomers have rather high viscosity at room temperature (e.g., 10,000–150,000 cps) and Tg about 55°–67° C., for coatability purposes it is generally necessary to include a low viscosity diluent with a low Tg to insure adequate flexibility. Solutions of oligomer in 20 to 40 wt. % di- or trifunctional diluent are useful. In a less complicated formulation, a single oligomer may be chosen such as a tetrafunctional aliphatic polyester with Tg of 0° C. and viscosity at 25° C. of 400–700 cps (Photomer® 5018).

Monofunctional precursors contain one polymerizable, ethylenically unsaturated functional group. Monofunctional precursors typically are low viscosity liquids. They adjust the properties of the polymer, e.g., flexibility and glass transition temperature, as well as act a polymerizable co-solvent for the components of the liquid polymerizable mixture used to form the polymeric material. Useful monofunctional precursors include, for example, N-vinyl pyrrolidone, tetrahydrofurfuryl acrylate (SR 285), tetrahydrofurfuryl ethacrylate (SR 203), and 2-(2-ethoxyethoxy) ethyl acrylate (SR 256).

If release properties are desired, the material may comprise 0.1 to 10 weight parts of polymerizable, ethylenically unsaturated, organo-silicone precursors. Typically, the polymerizable, ethylenically unsaturated, organo-silicone is an acrylated silicone such as an acrylated-oxyalkylene-silicone in which the alkylene is ethylene, propylene or a combination thereof, e.g., Ebecryl® 350 and Ebecryl® 1360 which have been discovered to have surfactant properties. From their cloud point behavior, water solubility, and infrared spectra, Ebecryl® 350 and Ebecryl® 1360 are believed to be acrylated polyoxyalkylene silicon copolymers in which the solubilizing polyether units are derived from polyethylene glycol, polypropylene glycol, or a mixture of the two polyethers. The simpler acrylated polydimethylsiloxanes such as Goldschmidt RC-726, are commonly employed in the release coating industry but are not water soluble. However, such acrylated polydimethylsiloxanes can be employed, particularly, if used in conjunction with an acrylated surfactant type silicone polymer such as Ebecryl® 350 or Ebecryl® 1360.

"Acrylated-oxyalkylene-silicone" means an organosilicone precursor having one or more acrylate or methacrylate groups bonded thereto, and one or more oxyalkylene groups incorporated therein or pendant thereto, wherein an oxyalkylene group has the structure:

—(CH₂CHR)—O— in which R is hydrogen or methyl.

Such acrylated-oxyalkylene-silicones may be used alone or in combination with an acrylated-silicone. Acrylated-oxyalkylene-silicones of this type include a polyacrylated polydimethylsiloxane-polyether copolymer having a viscosity of 200–300 centipoise at 25° C. (Ebecryl® 350); a hexaacrylate of a polydimethyl-siloxane-polyether copolymer having a viscosity of 1000–3000 centipoise at 25° C. (Ebecryl® 1360); and acrylate derivatives of hydroxy endcapped polydimethylsiloxane-polyether copolymers such as Silwet® L 7604, Coat-o-Sil® 3500 and Coat-o-Sil® 3501. Although the acrylated-silicone class of compounds (e.g., acrylated polydimethylsiloxane) are neither water miscible nor compatible with quaternary salts, it was discovered that acrylated-oxyalkylene-silicones were acrylated surfactants of the siloxane-g-polyether type and, furthermore, were of high enough hydrophile/lipophile balance to have significant water solubility. Accordingly, when such acrylated silicone surfactants are incorporated into the quaternary containing coating mixtures, a solution can be obtained in precursor rich formulations, especially those with a coupling solvent, and in formulations containing oligomeric acrylates to improve cure rate and physical properties, each of which can be readily cured to a dry film.

The efficacy of quite small amounts of such an acrylated silicone surfactant, 1–4 wt. %, in providing release properties toward aggressive pressure-sensitive adhesives is outstanding. It has been noted that the efficacy of the acrylated silicone release properties seems to be affected by the quaternary salt concentration being better with 28–30 wt. % quaternary than with 20–25 wt. % present; and that the acrylated silicone, Ebecryl® 350, provides good release at 1–4 wt. % all by itself and use of Ebecryl® 1360 provides no significant advantage aside from increasing the stability of dispersion type mixes. It was also noted that Ebecryl® 1360 acrylated siloxane (found to be a high HLB siloxane-g-polyether surfactant) caused significant and undesirable viscosity exaltation in some mixes compared to analogous formulations using Ebecryl® 350 (2400 cps. vs. 1400 cps.).

Additional Components

The material may comprise a photoinitiators to facilitate copolymerization of the polymerizable precursors. When the material is to be cured by irradiation with ultraviolet radiation, a free radical generating, initiating system activatable by ultraviolet radiation by be present. Suitable photoinitiating systems have been described in "Photoinitiators for Free-Radical-Initiated Photoimaging Systems," by B. M. Monroe and G. C. Weed, Chem. Rev., 93, 435–448 (1993) and in "Free Radical Polymerization" by K. K. Dietliker, in Chemistry and Technology of UV and EB Formulation for Coatings, Inks, and Paints, P. K. T. Oldring, ed, SITA Technology Ltd., London, 1991, Vol. 3, pp. 59–525.

Preferred free radical photoinitiating compounds include benzophenone; 2-hydroxy-2-methyl1-phenylpropan-1-one (Darocur® 1173); 2,4,6-trimethylbenzolyl-diphenylphosphine oxide (Lucerin® TPO); 2,2-dimethoxy-2-phenyl-acetophenone (benzildimethyl ketal, BDK, Irgacure® 651, Lucerin® BDK); 2-methyl-1-[4-(methylthio) phenyl]-2-morpholinopropanone-1 (Irgacure® 907); 1-hydroxycyclohexylphenyl ketone (HCPK, Irgacure® 184); bis(2,6-dimethoxybenzolyl)-2,4,4-trimethylpentylphosphine oxide; and combinations thereof. Mixed photo-initiators include a 50:50 blend of 2-hydroxy-2-methyl-1-phenylpropan-1-one and 2,4,6-trimethylbenzolyl-diphenylphosphine oxide (Darocur® 4265); and a 25:75 blend of bis(2,6-dimethoxybenzolyl)-2,4,4-trimethylpentyl-phosphine oxide and 2-hydroxy-2-methyl-1-phenylpropan-1-one (CGI 1700).

Composition

The number of components in the material is unrestricted except that a quaternary salt precursor and a conductivity exalting comonomer must be included. The particular choices of ingredients will be determined by the specific combination of properties desired in the cured electrically conductive material, i.e., level of resistivity, flexibility, release characteristics, cure rate, and need to overcoat with a different lacquer composition.

The polymerizable, conductivity exalting comonomer and the polymerizable, ethylenically unsaturated ammonium precursor together comprise 40 to 100 parts by weight of the total weight of the polymerizable precursors and comonomers present in the material. Preferably, they comprise 45 to 90 parts by weight of the polymerizable precursors and comonomers present in the material. The ratio of polymerizable, conductivity exalting comonomer or monomers to polymerizable, ethylenically unsaturated ammonium precursor is in the range of 0.25 to 2.0. This means that the comonomer is between about 20 parts by weight to 67 parts by weight of the total of comonomer and ammonium precursor and the ammonium precursor is between 33 parts by weight and 80 parts by weight of the total of comonomer and ammonium precursor. Preferably, the ratio of polymerizable, conductivity exalting comonomer or monomers to polymerizable, ethylenically unsaturated ammonium precursor is in the range of 0.33 to 1.5. This means that, preferably, the comonomer is between about 25 parts by weight to 60 parts by weight of the total of comonomer and ammonium precursor and the ammonium precursor is between 40 parts by weight and 75 parts by weight of the total of comonomer and ammonium precursor.

Other polymerizable precursors comprise 0 to 60 parts by weight of the polymerizable precursors and comonomers present in the material. Preferably, other polymerizable precursors comprise 10 to 55 parts by weight of the polymerizable precursors and comonomers present in the material. Typically most or all of the other polymerizable precursors are multifunctional polymerizable precursors. The multifunctional polymerizable precursors are typically greater that 55 parts by weight, and preferably greater than 85 parts by weight of the other polymerizable precursors. If release properties are desired, about 0.1 to 10 parts by weight of polymerizable, ethylenically unsaturated, organosilicone precursors, based on the total weight of the material, may be included in the material.

The total weight of the polymerizable precursors and comonomers does not include either the weight of the photoinitiator system or the weight any non-polymerizable material present in the material. Before irradiation, the unpolymerized material contains typically about 1 to 10 parts by weight, more typically about 3 to 8 parts by weight, of the photoinitiator, based on the dry weight of the unpolymerized material. When the polymerizable mixture is to be cured by irradiation with an electron beam, an initiating system is not required.

INDUSTRIAL APPLICABILITY

The electrically conductive polymeric material can be used in electrographic imaging elements, which require a conductive layer with an electrical resistance between about $1 \times 10^5$ $\Omega/\square$ and $1 \times 10^7$ $\Omega/\square$. Electrographic elements and processes for forming electrographic images are disclosed in Cahill, U.S. Pat. Nos. 5,414,502 and 5,483,321, incorporated herein by reference.

Figure 1:
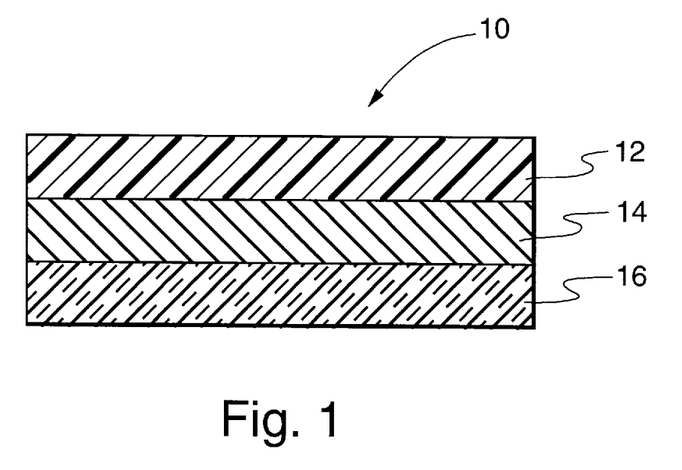
FIG. 1 is a schematic representation of an imaging element suitable for use in an electrographic imaging process.

Referring to FIG. 1, an element 10, suitable for use in an electrographic imaging process comprises, support 12, conductive layer 14, and dielectric layer 16.

Support 12 functions as a support for the superposed layers and may be any web or sheet material possessing suitable flexibility, dimensional stability and adherence properties to the conductive layer 14. Suitable web or sheet materials for support 12 are flexible polymeric films, such as polyethylene terephthalate film, or a foraminous material, such as a paper sheet Conductive layer 14 is a layer of the conductive material of this invention. Conductive layer 14 typically has a thickness about 1 micron to about 20 microns.

Dielectric layer 16 may be any conventional film-forming material having a dielectric constant of about 2 to about 5. This layer typically has a thickness of about 1 $\mu$m to about 20 $\mu$m and preferably about 3 $\mu$m to about 10 $\mu$m. The property requirements of the dielectric layer are well known in the art as disclosed, for example, in U.S. Pat. Nos. 3,920,880 and 4,201,701. A transparent dielectric layer is preferred.

The elements are useful for the production of images, especially colored images. Electrographic imaging is particularly useful for forming large size images, such as are required for banners, billboards, and other out-of-doors advertisements. The image is formed by forming a latent image of charge on dielectric layer 16 and toning the latent image.

When a multi-colored image is desired, the imaging and toning steps are repeated with additional toners of different colors, in either sequentially arranged imaging and toning stations or by passing the element under the same imaging station and replacing the toner in the toning station. Color reproduction usually requires three and preferably four different color toners to render a pleasing and accurate facsimile of an original color image. The selection of toner colors and the creation of the different images whose combination will provide such accurate rendition of an original image is well known in the art.

The advantageous properties of this invention can be observed by reference to the following examples which illustrate, but do not limit, the invention.

EXAMPLES

Glossary

Ageflex® FA1Q80MC 80% 2-Acryloyloxyethyltrimethylammonium chloride in water (CPS Chemical, Old Bridge, N.J.)

Ageflex® FA1Q80DMS 80% 2-Acryloyloxyethyltrimethylammonium dimethylsulfate in water (CPS Chemical, Old Bridge, N.J.)

Butyl Carbitol® Diethylene glycol monobutyl ether (Union Carbide, Danbury, Conn.)

Darocur® 1173 2-Hydroxy-2-methyl-1-phenylpropan-1-one (Ciba Geigy, Hawthorne, N.Y.)

β-CEA Carboxyethyl acrylate

2-CNEA 2-Cyanoethyl acrylate

DMDAC Dimethyldiallylammonium chloride

Ebecryl® 350 Polyacrylated polydimethylsiloxane-polyether copolymer having a viscosity of 200–300 cp at 25° C. (U.C.B. Radcure Inc., Smyrna, Ga.)

Ebecryl® 810 Tetrafunctional polyester acrylate (U.C.B. Radcure Inc., Smyrna, Ga.)

Ebecryl® 1360 Hexaacrylate of a polydimethylsiloxane-polyether copolymer having a viscosity of 1000–3000 centipoise at 25° C. (U.C.B. Radcure Inc., Smyrna, Ga.)

Ebecryl® 1608 Bisphenol A epoxy acrylate & 20% propoxylated glycerol triacrylate (U.C.B. Radcure Inc., Smyrna, Ga.)

Ebecryl® 3200 Blend of aliphatic and aromatic acrylated epoxy resins (U.C.B. Radcure Inc., Smyrna, Ga.)

2-HEA 2-Hydroxyethyl acrylate

MA-2HEA 2-Hydroxyethyl methacrylate

Mylar® film Polyethylene terephthalate film (E.I. du Pont de Nemours & Co., Wilmington, Del.)

SR 256 2-(2-Ethoxyethoxy)ethyl acrylate (Sartomer, West Chester, Pa.)

SR 285 Tetrahydrofurfuryl acrylate (Sartomer, West Chester, Pa.)

PET3A Pentaerythritol triacrylate

Photomer® 5018 Tetrafunctional polyester acrylate (Henkel Corp., Ambler, Pa.)

TMPEOTA Trimethylolpropane ethoxylate triacrylate

General Procedures

Polymer electrical conductivity is expressed as the surface resistivity of a film of the polymeric material coated on a sheet substrate, and is expressed in "ohms per square" ($\Omega/\square$). Surface resistivity was measured under TAPPI conditions, 73° F. (about 23° C.) and 50% relative humidity, across a probe having a 6.0 in×6.0 in area (about 15.2 cm×15.2 cm) between two 0.50 in² cross-section (about 1.61 cm²) brass bars connected to a General Radio 1864 Megohmmeter. Each coating was cut to fit the outside dimensions of the probe and conditioned at 50% relative humidity at 73° F. (about 23° C.) for about 1 to 2 hr before measurement was made.

Example 1

This example illustrates the large exaltation in conductivity that results when a carboxylated monomer, such as mono(2-acryloylethyl)maleate, is used in the formulation.

The following composition was coated onto 7 mil (about 180 micron) thick MylarO polyester film with a #20 Mayer rod and cured by exposure to two 400 watts per inch (about 160 watts/cm) mercury vapor lamps at a speed of 200 ft/min (about 100 cm/sec).

| Component | Amount (g) |
| --- | --- |
| Ageflex ® FA1Q80MC | 33.04 |
| Mono(2-acryloylethyl)maleate | 17.62 |
| Ebecryl ® 3200 | 22.02 |
| Ebecryl ® 810 | 22.02 |
| Darocur ® 1173 + 10% benzophenone | 5.28 |
| Ebecryl ® 350 | 0.88 |
| Ebecryl ® 1360 | 0.88 |

Surface resistivity was measured on three different samples of the cured coating. Measured resistivities were $6 \times 10^5$ Ω/□, $7-8 \times 10^5$ Ω/□, and $6 \times 10^5$ Ω/□.

A similar coating, in which the mono(2-acryloylethyl)maleate was replaced by TMPEOTA, was prepared by essentially the same procedure. The measured resistivity was $4 \times 10^7$ Ω/□, nearly one hundred times greater. When this composition was coated with a #36 Mayer rod, instead of a #20 Mayer rod, the measured resistivity was $1.1-2.5 \times 10^8$ Ω/□.

Example 2

This example illustrates the properties of a very thin conductive coating on a polyester film.

The following composition was prepared and coated onto 7 mil (about 180 micron) thick Mylar® polyester film with a smooth Mayer rod. The coating was cured by a single pass exposure at a speed of 300 ft/min (about 150 cm/sec).

| Component | Amount (g) |
| --- | --- |
| Ageflex ® FA1Q80MC | 33.0 |
| β-CEA | 20.0 |
| TMPEOTA | 20.0 |
| Ebecryl ® 1608 | 22.0 |
| Darocur ® 1173 + 10% benzophenone | 5.3 |
| Ebecryl ® 350 | 5.3 |

Surface resistivity was $1.1 \times 10^6$ Ω/□. The resistivity of the surface of the uncoated polyester film was $11 \times 10^{11}$ Ω/□.

Example 3

This example illustrates the properties of a very thin conductive coating on a paper substrate.

The following composition was prepared and coated onto Otis Specialty DR conductive paper (Otis Specialty Papers, Jay, Me.) with a smooth Mayer rod. The coating was cured by a single pass exposure at a speed of 300 ft/min (about 150 cm/sec).

| Component | Amount (parts) |
| --- | --- |
| Ageflex ® FA1Q80MC | 33.0 |
| β-CEA | 20.0 |
| TMPEOTA | 20.0 |
| Ebecryl ® 1608 | 22.0 |
| Darocur ® 1173 + 10% benzophenone | 5.3 |
| Ebecryl ® 350 | 1.0 |

Surface resistivity was $8 \times 10^5$ Ω/□. The resistivity of the surface of the uncoated paper was $2.5 \times 10^6$ Ω/□.

A similar coating on Champion 60 lb litho paper has a surface resistivity was $2.4 \times 10^6$ Ω/□. The resistivity of the surface of the uncoated paper was $1 \times 10^{10}$ Ω/□.

Example 4

This example illustrates the large exaltation in conductivity that results when a carboxylated monomer, such as mono(2-acryloylethyl)maleate, is used in a formulation used to coat a paper substrate.

The following composition was prepared and coated onto Otis Specialty DR conductive paper with a smooth Mayer rod. The coating was cured by a single pass exposure at a speed of 450 ft/min (about 225 cm/sec).

| Component | Amount (g) |
| --- | --- |
| Ageflex ® FA1Q80MC | 7.5 |
| Mono(2-acryloylethyl)maleate | 4.0 |
| Ebecryl ® 1608 | 5.0 |
| Photomer ® 5018 | 5.0 |
| Darocur ® 1173 | 1.2 |
| Ebecryl ® 1360 | 0.4 |

Surface resistivity was $8 \times 10^5$ Ω/□. A similar coating, in which the mono(2-acryloylethyl)maleate was replaced by TMPEOTA, was prepared by essentially the same procedure. The measured resistivity was $5-10 \times 10^6$ Ω/□. The resistivity of the surface of the uncoated paper was $2.5 \times 10^6$ Ω/□.

Example 5

This example illustrates curing of a photoinitiator-free composition by electron beam irradiation.

The following composition was prepared and coated onto Otis Specialty DR conductive paper with a smooth Mayer rod. The coating was cured to a dry glossy coating with 0.5 megarad of irradiation. Irradiation was carried out in the pilot unit at Energy Sciences, Inc., Wilmington, Mass.

| Component | Amount (g) |
| --- | --- |
| Ageflex ® FA1Q80MC | 264 |
| β-CEA | 160 |
| TMPEOTA | 160 |
| Ebecryl ® 1608 | 176 |
| Ebecryl ® 350 | 8 |
| Ebecryl ® 1360 | 8 |

Surface resistivity was $6-8 \times 10^5$ Ω/□. The resistivity of the surface of the uncoated paper was $2.5 \times 10^6$ Ω/□.

Example 6

This example illustrates that the resistivity of a composition that contains dimethyldiallylammonium chloride, a non-acrylic quaternary ammonium monomer, compares favorably with those that contain acrylic quaternary ammonium salts. The following composition was prepared and coated onto 4 mil (about 100 micron) thick ICI 583 polyester film (ICI Americas, Wilmington, Del.) with a #36 Mayer rod. The coating was cured by two passes under two 350 watts/in (about 140 watts/cm) mercury vapor lamps at 200 ft/min (about 100 cm/sec).

| Component | Amount (g) |
|---|---|
| 60% DMDAC in water | 16.67 |
| PET3A | 10.00 |
| β-CEA | 13.33 |
| Darocur ® 1173 | 1.67 |

The hazy dispersion was sufficiently stable to coat without either added solvent or a surfactant. A hazy but transparent tack-free coating was produced after irradiation. Surface resistivity was $1.1 \times 10^6$ Ω/□.

A composition was coated onto Otis Specialty DR conductive paper with a smooth Mayer rod and cured with one pass under two 350 watts/in (about 140 watts/cm) mercury vapor lamps at 500 ft/min (about 250 cm/sec). The cured coating had a surface resistivity of $0.8-1.0 \times 10^6$ Ω/□.

Example 7

This example illustrates the characteristics of a clear conductive coating derived from a clear equimolar solution of an acrylic quaternary ammonium monomer, Ageflex® FA1Q80MC, and mono(2-acryloylethyl)maleate.

The following composition was prepared and coated onto 4 mil (about 100 micron) thick ICI 583 polyester film. The coating was cured by four passes under two 350 watts/in (about 140 watts/cm) mercury vapor lamps at 100 ft/min (about 50 cm/sec).

| Component | Amount (g) |
|---|---|
| Ageflex ® FA1Q80MC | 30.00 |
| Mono(2-acryloylethyl)maleate | 28.27 |
| Darocur ® 1173 | 2.91 |

The quaternary ammonium salt is 43.5 parts by weight of the total solids. A coating prepared with a #22 Mayer rod had a surface resistivity was $5-6 \times 10^5$ Ω/□. A coating prepared with a #36 Mayer rod had a surface resistivity was $1.7-2 \times 10^5$ Ω/□.

A sample of the cured coating dried for 2 min at 250° F. (121° C.) had the same surface resistivity, $3-5 \times 10^7$ Ω/□, as an undried sample. After equilibration under TAPPI conditions each sample had a surface resistivity of $1.7 \times 10^5$ Ω/□.

The cured coating is wet by water with a low contact angle. Immersion in water for 45 min at room temperature did not haze or dissolve the coating, indicating that the mono(2-acryloylethyl)-maleate is apparently capable of cross-linking the coating.

Example 8

Examples 8–21 illustrate the use of solutions and solvent modified dispersions of the co-reactants to coat radiation curable coatings. Unless otherwise indicated, each sample was coated onto 4 mil (about 100 micron) thick ICI 583 polyester film with a #36 Mayer rod. The coating was cured by two passes under two 350 watts/in (about 140 watts/cm) mercury vapor lamps at 200 ft/min (about 100 cm/sec).

Example 8 illustrates the effect on surface resistivity of replacing SR 256 with 2-hydroxyethyl acrylate, a conductivity exalting comonomer.

| Component (g) | Control A | Example 8 |
|---|---|---|
| Ageflex ® FA1Q80MC | 8.0 | 8.0 |
| 2-HEA | 0 | 6.0 |
| SR 256 | 6.0 | 0 |
| PET3A | 4.0 | 4.0 |
| Darocur ® 1173 | 1.2 | 1.2 |
| Ebecryl ® 350 | 0.11 | 0.11 |
| Water | 1.5 | 0 |
| Butyl Carbitol ® | 1.5 | 0 |
| Appearance | Hazy | Clear |
| Resistivity (Ω/□) | $2-3 \times 10^8$ | $2 \times 10^5$ |

Examples 9–12

Examples 9–12 illustrate the effect on surface resistivity of increasing the proportion of β-CEA, a conductivity exalting comonomer.

| Component (g) | Control A | Example 9 | Example 10 |
|---|---|---|---|
| Ageflex ® FA1Q80MC | 8.0 | 8.0 | 8.0 |
| β-CEA | 0 | 2.0 | 3.0 |
| SR 256 | 6.0 | 4.0 | 3.0 |
| PET3A | 4.0 | 4.0 | 4.0 |
| Darocur ® 1173 | 1.2 | 1.2 | 1.2 |
| Ebecryl ® 350 | 0.11 | 0.11 | 0.11 |
| Water | 1.5 | 1.5 | 1.5 |
| Butyl Carbitol ® | 1.5 | 1.5 | 1.5 |
| Appearance | Hazy | Hazy | Hazy[a] |
| Resistivity (Ω/□) | $2-3 \times 10^8$ | $1-3 \times 10^7$ | $3-6 \times 10^5$ |

[a]Coating thickness: 50 microns

| Component (g) | Example 11 | Example 12 |
|---|---|---|
| Ageflex ® FA1Q80MC | 8.0 | 8.0 |
| β-CEA | 5.0 | 6.0 |
| SR 256 | 1.0 | 0.0 |
| PET3A | 4.0 | 4.0 |
| Darocur ® 1173 | 1.2 | 1.2 |
| Ebecryl ® 350 | 0.11 | 0.11 |
| Water | 1.5 | 1.5 |
| Butyl Carbitol ® | 1.5 | 1.5 |
| Appearance | Very light haze | Clear |
| Resistivity (Ω/□) | $5-10 \times 10^5$ | $1.7-2 \times 10^5$ |

Examples 13–15

Examples 13–15 illustrate the effect on surface resistivity of increasing the amount of MA-2HEA, a conductivity exalting comonomer.

| Component (g) | Control B | Example 13 | Example 14 | Example 15 |
|---|---|---|---|---|
| Ageflex ® FA1Q80DMS | 11.11 | 11.11 | 11.11 | 11.11 |
| MA-2HEA | 0 | 2.0 | 4.0 | 6.0 |
| SR 256 | 6.0 | 4.0 | 3.0 | 1.0 |
| PET3A | 4.0 | 4.0 | 4.0 | 4.0 |
| Darocur ® 1173 | 1.2 | 1.2 | 1.2 | 1.2 |
| Appearance | Hazy | Hazy | Slight haze | Hazy |
| Resistivity (Ω/□) | $2 \times 10^8$ | $2-5 \times 10^5$ | $3-5 \times 10^5$ | $0.6 \times 10^5$ |

Example 16

Example 16 illustrates the effect on surface resistivity of replacing SR 256 with 2-hydroxyethyl acrylate, a conductivity exalting comonomer.

| Component (g) | Control C | Example 16 |
|---|---|---|
| Ageflex ® FA1Q80DMS | 8.0 | 8.0 |
| 2-HEA | 0.0 | 6.0 |
| SR 256 | 6.0 | 0 |
| PET3A | 4.0 | 4.0 |
| Ebecryl ® 350 | 0.11 | 0.11 |
| Darocur ® 1173 | 1.2 | 1.2 |
| Water | 1.75 | 2.0 |
| Butyl Carbitol ® | 1.75 | 0 |
| Appearance | Hazy | Clear |
| Resistivity (Ω/□) | 2–3 × 10$^8$ | 7 × 10$^5$ |

A coating of Control C coated with a #50 Mayer rod had a surface resistivity of 5–7×10$^7$ Ω/□.

Example 17

Example 17 illustrates the effect on surface resistivity of replacing part of the SR 256 with β-CEA in a composition with a reduced proportion of Ageflex® FA1Q80MC.

| Component (g) | Control D | Example 17 |
|---|---|---|
| Ageflex ® FA1Q80DMS | 4.0 | 4.0 |
| β-CEA | 0 | 6.0 |
| SR 256 | 9.2 | 3.2 |
| PET3A | 4.0 | 4.0 |
| Ebecryl ® 350 | 0.11 | 0.11 |
| Darocur ® 1173 | 1.2 | 1.2 |
| Appearance | Clear | Clear |
| Resistivity (Ω/□) | 6 × 10$^9$ | 1.5 × 10$^5$ |

Examples 18–19

Examples 18 and 19 illustrate the effect on surface resistivity of replacing SR 256 with 2-cyanoethyl acrylate, a conductivity exalting comonomer.

| Component (g) | Control E | Example 18 | Example 19 |
|---|---|---|---|
| Ageflex ® FA1Q80DMS | 8.0 | 8.0 | 8.0 |
| 2-CNEA | 0 | 6.0 | 6.0 |
| SR 256 | 6.0 | 0 | 0 |
| PET3A | 4.0 | 4.0 | 4.0 |
| Ebecryl ® 350 | 0.11 | 0.11 | 0 |
| Darocur ® 1173 | 1.2 | 1.2 | 1.2 |
| Water | 1.75 | 0 | 0 |
| Butyl Carbitol ® | 1.75 | 5.0 | 5.0 |
| Appearance | Hazy | Clear | Clear |
| Resistivity (Ω/□) | 7–9 × 10$^7$ | 2.5 × 10$^5$ | 2.5 × 10$^5$ |

A coating of Control E coated with a #50 Mayer rod had a surface resistivity of 7–10×10$^9$ Ω/□.

Example 20

Example 20 illustrates the effect on surface resistivity of replacing the SR 256 with SR 285 in a composition that contains carboxyethyl acrylate, a conductivity exalting comonomer.

| Component (g) | Example 10 | Example 20 |
|---|---|---|
| Ageflex ® FA1Q80MC | 8.0 | 8.0 |
| β-CEA | 3.0 | 3.0 |
| SR 256 | 3.0 | 0 |
| SR 285 | 0 | 3.0 |
| PET3A | 4.0 | 4.0 |
| Darocur ® 1173 | 1.2 | 1.2 |
| Ebecryl ® 350 | 0.11 | 0.11 |
| Water | 1.5 | 0 |
| Butyl Carbitol ® | 1.5 | 0 |
| Appearance | Hazy[a] | Hazy[b] |
| Resistivity (Ω/□) | 3–6 × 10$^5$ | 5–6 × 10$^4$ |

[a]Coating thickness: 50 microns.
[b]Coating thickness: 57 microns.

Example 21

Example 21 illustrates the surface resistivity of an additional composition containing 2-hydroxyethyl acrylate, a conductivity exalting comonomer.

| Component (g) | Example 21 |
|---|---|
| Ageflex ® FA1Q80MC | 33.0 |
| 2-HEA | 20.0 |
| Ebecryl ® 1608 | 22.0 |
| TMPEOTA | 20.0 |
| Darocur ® 1173 | 5.3 |
| Ebecryl ® 350 | 1.0 |
| Resistivity (Ω/□)[a] | 1.8–3 × 10$^6$ |
| Resistivity (Ω/□)[b] | 7 × 10$^5$ |

[a]Coated with a smooth rod.
[b]Coated with a #36 Mayer rod.

Having described the invention, we now claim the following and their equivalents.

What is claimed is:

1. An electrically conductive material, which comprises in polymerized form:
   (A) 45 to 90 parts by weight, based on the total weight of polymerizable precursors and comonomers in the material, of:
      (1) a polymerizable, conductivity exalting comonomer, said comonomer selected from the group consisting of interpolymerizable acids with an acid number between 100 and 900, hydroxyalkyl esters of acrylic or methacrylic acid, cyanoalkyl esters of acrylic or methacrylic acid, and combinations thereof; and
      (2) a polymerizable, ethylenically unsaturated precursor that contains a quaternary ammonium cation and an inorganic or organic anion;
         wherein the comonomer is between about 20 parts by weight to 67 parts by weight of the total of comonomer and polymerizable, ethylenically unsaturated precursor and the polymerizable, ethylenically unsaturated precursor is between 33 parts by weight and 80 parts by weight of the total of comonomer and polymerizable, ethylenically unsaturated precursor; and
   (B) 10 to 55 parts by weight, based on the total weight of polymerizable precursors and comonomers in the material, of other polymerizable precursors;
   wherein:
      greater than 55 parts by weight of said other polymerizable precursors are polymerizable precursors having two or more ethylenically unsaturated groups capable of free radical addition polymerization; and a layer of said material has a surface resistivity of $1 \times 10^4$ to $1 \times 10^7$ Ω/□.

2. The material of claim 1 wherein a layer of said material has a surface resistivity of $5 \times 10^4$ to $5 \times 10^6$ Ω/□.

3. The material of claim 1 wherein the ratio of said polymerizable, conductivity exalting comonomer to said polymerizable, ethylenically unsaturated precursor is in the range of 0.3 to 1.5.

4. The material of claim 3 wherein a layer of said material has a surface resistivity of $5 \times 10^4$ to $5 \times 10^6$ Ω/□.

5. The material of claim 4 wherein the polymerizable, conductivity exalting comonomer is an interpolymerizable acid selected from the group consisting of acrylic acid, methacrylic acid, β-carboxyethyl acrylate, itaconic acid, 2-(acryloyloxy)ethyl maleate, 2-(methacryloyloxy)ethyl maleate, 2-(acryloyloxy)propyl maleate, 2-(methacryloyloxy)propyl maleate, 2-(acryloyloxy)ethyl succinate, 2-(methacryloyloxy)ethyl succinate, 2-(acryloyloxy)-ethyl o-phthalate, 2-(methacryloyloxy)ethyl o-phthalate, 1-carboxy-2-[2-acryloxyloxyethylcarboxylate]cyclohex-4-ene, 1-carboxy-2-[2-methacryloxyloxyethylcarboxylate]cyclohex-4-ene, [Ebecryl® 169, Ebecryl® 170, ]and combinations thereof.

6. The material of claim 4 wherein the polymerizable, conductivity exalting comonomer is selected from the group consisting of 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, and combinations thereof.

7. The material of claim 4 wherein the polymerizable, conductivity exalting comonomer is selected from the group consisting of 2-cyanoethyl acrylate and 2-cyanoethyl methacrylate.

8. The material of claim 1 in the form of a layer wherein the layer-has a thickness about 1 micron to about 20 microns.

9. The material of claim 9 wherein the layer of said material has a surface resistivity of $5 \times 10^4$ to $5 \times 10^6$ Ω/□.

10. The material of claim 8 wherein the comonomer is between about 25 parts by weight to 60 parts by weight of the total of comonomer and polymerizable, ethylenically unsaturated precursor and the polymerizable, ethylenically unsaturated precursor is between 40 parts by weight and 75 parts by weight of the total of comonomer and polymerizable, ethylenically unsaturated precursor.

11. The material of claim 10 wherein said layer of said material has a surface resistivity of $5 \times 10^4$ to $5 \times 10^6$ Ω/□.

12. The material of claim 1 wherein the polymerizable, conductivity exalting comonomer is an interpolymerizable acid with an acid number between 100 and 900.

13. The material of claim 12 wherein a layer of said material has a surface resistivity of $5 \times 10^4$ to $5 \times 10^6$ Ω/□.

14. The material of claim 12 wherein the comonomer is between about 25 parts by weight to 60 parts by weight of the total of comonomer and polymerizable, ethylenically unsaturated precursor and the polymerizable, ethylenically unsaturated precursor is between 40 parts by weight and 75 parts by weight of the total of comonomer and polymerizable, ethylenically unsaturated precursor.

15. The material of claim 12 wherein said conductivity exalting comonomer is β-carboxyethyl acrylate.

16. The material of claim 12 wherein greater than 85 parts by weight of said other polymerizable precursors are multifunctional polymerizable precursors.

17. The material of claim 16 wherein the polymerizable, conductivity exalting comonomer is an interpolymerizable acid selected from the group consisting of acrylic acid, methacrylic acid, β-carboxyethyl acrylate, itaconic acid, 2-(acryloyloxy)ethyl maleate, 2-(methacryloyloxy)ethyl maleate, 2-(acryloyloxy)propyl maleate, 2-(methacryloyloxy)propyl maleate, 2-(acryloyloxy)ethyl succinate, 2-(methacryloyloxy)ethyl succinate, 2-(acryloyloxy)-ethyl o-phthalate, 2-(methacryloyloxy)ethyl o-phthalate, 1-carboxy-2-[2-acryloxyloxyethylcarboxylate]cyclohex-4-ene, 1-carboxy-2-[2-methacryloxyloxyethylcarboxylate]cyclohex-4-ene, and combinations thereof.

18. The material of claim 3 wherein the polymerizable, ethylenically unsaturated precursor contains a cation selected from the group consisting of (3-(methacryloylamino)-propyl)-trimethylammonium, (2-(methacryloyloxy)-ethyl)trimethylammonium, (2-(acryloyloxy)ethyl)trimethylammonium, (2-(methacryloyloxy)-ethyl)-methyldiethylammonium, 4-vinylbenzyltrimethylammonium, dimethyldiallylammonium and mixtures thereof.

19. The material of claim 1 wherein greater than 85 parts by weight of said other polymerizable precursors are multifunctional polymerizable precursors.

20. The material of claim 10 wherein greater than 85 parts by weight of said other polymerizable precursors are multifunctional polymerizable precursors.

21. The material of claim 18 wherein a layer of said material has a surface resistivity of $5 \times 10^4$ to $5 \times 10^6$ Ω/□.

22. The material of claim 21 wherein the comonomer is between about 25 parts by weight to 60 parts by weight of the total of comonomer and polymerizable, ethylenically unsaturated precursor and the polymerizable, ethylenically unsaturated precursor is between 40 parts by weight and 75 parts by weight of the total of comonomer and polymerizable, ethylenically unsaturated precursor.

* * * * *